3,525,245
FORMATION OF HOLLOW METAL BILLETS
William Arthur Sallis, Chesterfield, England, assignor to
The Chesterfield Tube Company Limited, Chesterfield,
England, a British company
Filed Apr. 3, 1967, Ser. No. 628,053
Claims priority, application Great Britain, Apr. 19, 1966,
17,044/66
Int. Cl. B21c 23/18
U.S. Cl. 72—267                                       3 Claims

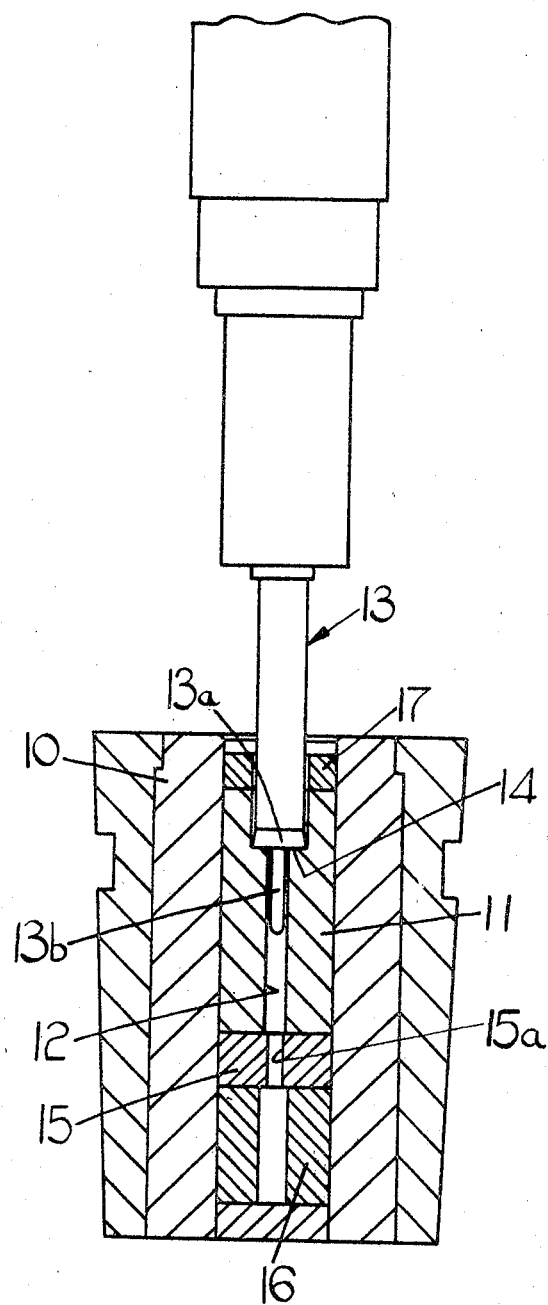

ABSTRACT OF THE DISCLOSURE

Apparatus for use in forming hollow metal billets with concentric bores, the apparatus comprising a container into which a billet pre-formed with an axially extending pilot hole can be inserted and a piercing tool having at its leading end as axially extending guide portion which enters said pilot hole to guide the remainder of the piercing tool which has a cross-section larger than that of the pilot hole, the length of the guide portion being not less than the maximum cross-sectional dimension of the remainder of the piercing tool.

---

This invention relates to the formation of hollow metal billets, one object of the invention being to provide in a convenient form apparatus adapted to produce such hollow metal billets in a manner which is not only economical but which also results in the billets having longitudinally extending bores which are substantially concentric with respect to the exteriors of the billets.

Apparatus in accordance with this aspect of the invention comprises in combination a container adapted to receive a billet which has previously been formed with a longitudinally extending and centrally arranged pilot hole of relatively small cross-section, and a piercing tool which is provided at its leading end with an axially extending guide portion adapted to enter into said pilot hole to guide the remainder of the piercing tool which has a cross-section larger than that of said pilot hole and the guide portion, the length of said axially extending guide portion of the piercing tool being not less than the maximum cross-sectional dimension of the remainder of the piercing tool rearwardly of the guide portion and one end of said container being closed by a closure member formed with an aperture which is shaped to admit said guide portion whereby the latter can penetrate said closure member. Where the piercing tool is of circular cross-section, the length of said guide portion is not less than the diameter of the operative portion of the tool rearwardly of the guide portion. Preferably, the length of said guide portion is not less than 1.25 times (and conveniently is between 1.25 times and 1.50 times) the maximum cross-sectional dimension of said operative portion of the piercing tool. Furthermore, the axially extending guide portion of the piercing tool is preferably slightly smaller in cross-section than the cross-section of the pilot hole formed in the billet as in this way lubrication between the surface of the pilot hole and the guide portion of the piercing tool will not be unduly impaired as piercing proceeds.

The invention will now be more particularly described with reference to the accompanying drawing which is a sectional elevation showing one example of apparatus in accordance with the invention.

Referring now to the drawing, the appartus shown therein includes a container 10 into which a heated billet 11 can be inserted, the billet having been previously formed with an axially extending centrally arranged pilot hole 12 of relatively small cross-section. There is also provided a piercing tool 13 which may be formed to any desired cross-section but which in the example now described is of cylindrical configuration. The operative portion 13a of said piercing tool has a diameter which is larger than the diameter of the aforesaid pilot hole and which may be anything up to 85% of the unpierced billet diameter.

At the forward or leading end of said operative portion 13a of the piercing tool there is provided an axially extending guide portion 13b which is also of circular cross-section so that the diameter of said guide portion is somewhat less than the diameter of the pilot hole 12 formed in the billet. This is to allow for the correct lubrication of the guide portion (provided in any convenient manner) as said guide portion enters the billet since if the diameter of the guide portion is equal to or greater than the diameter of the pilot hole 12 any lubricant applied either to the leading end of the guide portion or to the surface of the pilot hole would be scraped off as the guide portion enters the pilot hole. Adhesion between the guide portion and the billet might then take place in which case the bore surface of the pierced billet would be roughened.

In the example now described the end of the operative portion 13a of the piercing tool adjacent to the guide portion 13b is of substantially plane configuration so as to form a flat annular face 14 and it will be appreciated that as said operative portion of the tool enters the billet, the billet material in contact with the leading end of said operative portion and for some distance in front of it will be deformed and will tend to fill all the free space, i.e. any space between the billet and the container and also the space between the billet and the guide portion of the tool. There is thus a tendency for the pilot hole 12 to become closed and if this happens the hole will not fulfil its function of guiding the piercing tool centrally through the billet. To prevent this happening it is necessary therefore that the guide portion 13b of the piercing tool should be long enough to reach beyond the zone of billet material which is disturbed by piercing. In accordance with the invention therefore the length of said guide portion 13b of the piercing tool is not less than the diameter of the operative portion 13a of the tool. Preferably the length of said guide portion is between 1.25 times and 1.50 times the diameter of the operative portion of the tool, the upper limit being chosen in order that the movement of a ram which will in practice displace the piercing tool shall not be impracticably long. It is however to be understood that the length of the guide portion may be greater than 1.50 times the diameter of the operative portion of the tool if desired.

By providing a guide portion 13b that is at least as long as the diameter of the operative portion 13a of the piercing tool, concentric piercing will be maintained throughout the full length of the billet since it will be found that the pilot hole remains open to guide the piercing tool throughout the whole operation.

The lower end of the container 10 is closed by a closure member 15 having an aperture 15a which is entered by said guide portion 13b of the piercing tool so as thereby to guide the piercing tool during the last part of its piercing stroke, said closure member 15 being supported on a block 16 having a larger central aperture. Furthermore, at the upper end of the billet, a guide ring 17 is placed in the container to engage the upper face of the billet, said guide ring having an aperture which has a cross-section corresponding to the cross-section of the operative part 13a of the piercing tool. Such guide ring is not however essential in all cases and may be dispensed with in certain instances.

As above described, the container is arranged so that in use its axis is vertical but it is of course to be understood that the invention can also be performed with the container axis horizontal. Furthermore, the pilot hole in the billet and the piercing tool can have cross-sections which are non-circular in shape. Also, although the end of the operative portion 13a of the piercing tool as described above has a flat annual face, said portion may alternatively have a curved end.

Having thus described my invention what I claim as new and desire to secure by Letters Patent is:

1. Apparatus for use in forming hollow metal billets comprising in combination a container adapted to receive a billet which has previously been formed with a longitudinally extending and centrally arranged pilot hole of relatively small cross-section, a piercing tool which is provided at its leading end with an axially extending guide portion adapted to enter into said pilot hole to guide the remainder of the piercing tool which has a cross-section larger than that of the pilot hole and the guide portion so that a shoulder is formed between said guide portion and the remainder of the tool, the length of said axially extending guide portion of the piercing tool being less than the length of said container and less than the initial length of the billet but not less than the maximum cross-sectional dimension of the remainder of the piercing tool rearwardly of the guide portion, whilst the latter is of constant cross-section over at least the major part of its length, and a closure member closing one end of said container, said closure member having an aperture which is shaped to admit said guide portion whereby the latter only can penetrate said closure member.

2. Apparatus as claimed in claim 1 wherein the length of said guide portion is not less than 1.25 times the maximum cross-sectional diameter of the remainder of the piercing tool.

3. Apparatus as claimed in claim 1 wherein the length of said guide portion is not greater than 1.50 times the maximum cross-sectional dimension of the remainder of the piercing tool.

References Cited

UNITED STATES PATENTS

| | | | |
|---|---|---|---|
| 2,161,419 | 6/1939 | Kipperman et al. | 72—267 X |
| 3,118,540 | 1/1964 | Brutsch et al. | 72—266 X |
| 1,955,243 | 4/1934 | Liebergeld et al. | 72—256 X |
| 3,335,589 | 8/1967 | Buffet | 72—267 X |
| 2,452,628 | 11/1948 | Bartlett et al. | 72—370 X |
| 2,956,337 | 10/1960 | Buffet et al. | 72—41 |
| 3,394,578 | 7/1968 | Biginelli | 72—254 |

FOREIGN PATENTS

| | | |
|---|---|---|
| 21,052 | 11/1900 | Great Britain. |
| 639,432 | 4/1962 | Canada. |

CHARLES W. LANHAM, Primary Examiner

A. L. HAVIS, Assistant Examiner

U.S. Cl. X.R.

72—273